United States Patent Office 3,740,429
Patented June 19, 1973

3,740,429
HELMINTH CONTROL
Samuel B. Soloway and Juan G. Morales, Modesto, Calif., assignors to Shell Oil Company, New York, N.Y.
No Drawing. Filed Oct. 9, 1970, Ser. No. 79,629
Int. Cl. A61k 27/00
U.S. Cl. 424—219                                   10 Claims

ABSTRACT OF THE DISCLOSURE

Internal helminth parasites of ruminants are controlled by certain beta-halovinyl esters of phosphorothionic acid.

BACKGROUND OF THE INVENTION

This invention relates to the control of internal helminth parasites in ruminants by employing as an anthelmintic one or more of certain beta-halovinyl esters of phosphorothionic acid. Beta-halovinyl esters of phosphoric acid are a known class of insecticides (U.S. Pats. 2,956,073; 3,116,201; 3,299,190) that are also known to be useful as anthelmintics (U.S. Pats. 3,166,472; 3,318,-769; and Canadian Pat. 731,113). Certain corresponding beta-chlorovinyl phosphorothionates are known to be useful as insecticides (see for example Seume et al., Toxicol. Appl. Pharmacol. 2,495, 1960 and U.S. Pat. 3,174,990). Phosphorothionates, however, are not generally known to be useful as anthelmintics.

SUMMARY OF THE INVENTION

It has been found that compounds of the formula

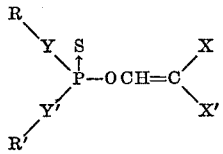

are active as anthelmintics. In the above formula, R and R' can be the same or different and are selected from the group consisting of alkyl, aryl, aralkyl, alkenyl, alkynyl and alkoxyalkyl groups containing up to 12 carbon atoms, Y and Y' can be the same or different and are selected from the group consisting of O, S, NR and NH; X is a member selected from the group consisting of fluorine, chlorine, bromine and iodine and X' is a member selected from the group consisting of fluorine, chlorine, bromine, iodine and hydrogen.

Because of their availability, a preferred embodiment of the invention encompasses those compounds of the above formula wherein R and R' are alkyl, Y and Y' are O, X is chlorine and X' is chlorine or fluorine.

The alkyl, alkenyl, alkaryl and alkoxyalkyl groups may be either straight or branched chained such as methyl, ethyl, propyl, isopropyl, butyl, sec-butyl, tert. butyl, octyl, decyl, dodecyl, vinyl, alkyl, methallyl, butenyl, decenyl, undecenyl, methoxymethyl, methoxypropyl, and the like.

The aryl and aralkyl groups may be phenyl, naphthyl, benzyl, phenethyl and the like, and may be substituted in the ring by substituents such as lower alkyl, halogen and nitro.

Especially preferred among the compounds above mentioned due to their activity and ease of preparation are those wherein R and R' can be the same or different and are alkyl or 4 to 8 carbon atoms; Y and Y' are both oxygen and X and X' are both chlorine.

While all compounds are not uniformly active, they appear to show greater activity against endoparasites in ruminants, i.e., in sheep and cattle.

These novel compounds heretofore unavailable by prior are methods are claimed in Ser. No. 79,699, filed Oct. 9, 1970. In general, these compounds are prepared through an intermediate made by reacting an O-(halovinyl) phosphorodichloridate with phosphorus pentasulfide to form an O-(halovinyl) phosphorodichloridothioate.

The compounds used in the present invention may then be obtained by the reaction of the intermediate phosphorodichloridothionate with a compound of the formula RYH or R'Y'H or a metal salt thereof wherein the symbols R,R',Y and Y' have the same meanings previously given. This reaction is carried out in the presence of a non-protonic solvent, such as diglyme, tetrahydrofuran, benzene and diethyl ether. The reaction may be carried out, when Y or Y' is O or S, in the presence of a base such as a tertiary amine, i.e., triethylamine, or in the presence of sodium hydride. Alternatively, the reaction may be carried out in the presence of a metal salt of the appropriate alcohol or thiol, i.e., sodium methoxide, etc. When Y or Y' is NR or NH the reaction is preferably carried out in the presence of an excess of the amine reactant. For preparing symmetrical compounds, i.e., those wherein R and R' are the same and Y and Y' are the same, the reaction is carried out by reacting from 2 to about 2.2 molar equivalents of the reactant with the phosphorodichloridothioate. When as unsymmetrical compound is prepared, the reaction is carried out by reacting at least one molar equivalent of the appropriate first reactant (RHY) with the phosphorodichloridothionate, followed by reaction with at least a molar equivalent of the second reaction R'Y'H'). When Y or Y' is NH the reactant containing that group is added last to prevent formation of a P=N compound. The reaction may be carried out under various conditions depending upon the reactants. For example, temperatures may vary from about −10 to 150° C. The reaction may be completed in minutes or may take hours or even days. The reaction may be terminated at any point but is usually continued until analysis shows the phosphorodichloridothionate has been completely reacted. The O-halovinyl phosphorothionate product is then separated from the reaction mixture by conventional techniques such as solvent extraction, filtration solvent removal and distillation to recover the purified product.

The following examples are illustrative of methods of preparing the compounds used in this invention

EXAMPLE I

O-(2,2-dichlorovinyl) phosphorodichloridothionate

A 411.9 gram (1.79 mole) sample of 2,2-dichlorovinyl phosphorodichloridate was added to 200 grams (0.9 mole) of phosphorus pentasulfide. A nitrogen atmosphere was maintained while the reaction mixture was heated for 5.5 hours in an oil bath at 165° C. The reaction mixture was an homogeneous deep burgundy viscous liquid. Methylene chloride (500 ml.) was then added to the reaction product causing a solid to separate. The solid was filtered to give 94.5 grams of a black powdery crystal containing some light colored amorphous solid dispersed through it. The filtrate was stripped in a rotating evaporator at 50–60° C. and 1.5 millimeters mercury pressure to remove solvent and light ends, which were discarded. The filtrate was then further stripped at 110° C. The light ends obtained from this second stripping amounted to 263.4 grams. This fraction was distilled through a 16" x 0.5" helix packed column with a variable reflux head. Product was collected at a reflux head temperature of from 39–43° C. and 0.02 millimiter pressure and amounted to 123.7 grams of 2,2-dichlorovinyl phosphorodichloridothionate; yield, 29.3%. The composition of the product was determined by gas liquid chromatography and the structure of the product was confirmed by nuclear magnetic resonance (NMR) and infrared spectrum as well as by chemical analysis for the P→S bond. Elemental analysis for PSOCl$_4$C$_2$H was as follows:

Calculated (percent): S, 13.0; P, 12.6; Cl, 57.7. Found (percent): S, 13.0; P, 12.6; Cl, 57.8.

EXAMPLE II

O-(2,2-dichlorovinyl) O,O-dimethyl phosphorothionate

A 12.95 gram (0.240 mole) portion of sodium methoxide was suspended in about 70 milliliters of tetrahydrofuran. The mixture was cooled to —5° C. and 30 grams (0.112 mole) of O-(2,2-dichlorovinyl) phosphorodichloridothioate was added. The reaction temperature was maintained at about —5 to 0° C. for two hours and at 32° C. for two more hours. Solvent was removed in a rotating evaporator. The residue was diluted with methylene chloride and a finely-divided salt was removed by filtration. The filtrate was stripped in a rotating evaporator at 40° C. at 0.5 millimeter of pressure to leave a residue of 26.4 grams. This crude residue was further distilled in a falling film molecular still at 61° C. (0.02 millimeter pressure) to yield 11.4 grams of a distillate, 2.0 grams of residue, and 7.3 grams of light ends. The distillate and light ends were combined and redistilled through an 8″ x ⅜″ helix pack column and a variable reflux head to yield 12 grams of product (41.5%). The composition of the product was determined by gas liquid chromatography (GLC) and further identification of the product was made by NMR spectrum as well as by infrared analysis. Elemental analysis was made of the product containing O(2,2 - dichlorovinyl) O,O - dimethyl phosphorothionate and a minor amount of the starting material of O-(2,2-dichlorovinyl) phosphorodichloridothioate.

EXAMPLE III

O-(2,2-dichlorovinyl) O,O-dipropyl phosphorothionate

To a stirred anhydrous tetrahydrofuran (THF) solution of 25 grams (0.10 mole) of O-(2,2-dichlorovinyl) phosphorodichloridothioate containing 12 grams of 50% sodium hydride mineral oil suspension (6 grams, 0.25 mole NaH) at 5–10° C. was added dropwise 12.1 grams (0.20 mole) of n-propanol. After the initial exothermic reaction ceased, the reaction mixture was refluxed for 4 hours and stirred at ambient temperature for approximately 12 hours. Excess NaH was destroyed by addition of a water-THF mixture. The THF was stripped and the remaining aqueous mixture was extracted with methylene chloride. The methylene chloride extracts were washed with water, dried with anhydrous magnesium sulfate and stripped to give 35 grams of crude O-(2,2-dichlorovinyl) O,O-dipropyl phosphorothionate. Distillation through a wiped-film molecular still gave 27.8 grams of product. Structural identification on microanalyses and NMR spectrum.

EXAMPLE IV

O-(2,2-dichlorovinyl) O,O-dibutyl phosphorothionate

To a stirred anhydrous (methanol free) diglyme solution of 15.0 grams (0.06 mole) of O-(2,2-dichlorovinyl) phosphorodichloridothioate containing 5.85 grams of a 50% sodium hydride mineral oil suspension (2.9 grams, 0.12 mole NaH) at 5–10° C. was added dropwise 9.1 grams (0.12 mole) of n-butanol. The reaction mixture was stirred at ambient temperatures for 16 hours and poured into water. Extraction of the water with methylene chloride was followed by washing of the methylene chloride extracts with water, drying with anhydrous magnesium sulfate and stripping, to give 13.0 grams of liquid. Elution through a silica gel-G-column using methylene chloride as diluent gave 9.3 grams (48%) clear liquid, which was identified by NMR as O-(2,2-dichlorovinyl) O-butyl phosphorodichloridothionate. This product was mixed with diglyme with one equivalent of butanol and one equivalent of sodium hydride and refluxed for three hours. Work up as described above, followed by repeated elution chromatography through silica gel-G using ethyl acetate, ethyl acetate-pentane (ratio 3:7) and finally distilled pentane as solvents afforded 5.1 grams of O-(2,2-dichlorovinyl) O,O-dibutyl phosphorothionate characterized by microanalyses and NMR spectrum.

EXAMPLE V

O-(2,2-dichlorovinyl) O,O-dipentyl phosphorothionate

This reaction was carried out by procedures described in Example III for the preparation of the dipropyl ester. A 78% yield of a light yellow product identified as O-(2,2-dichlorovinyl) O,O-dipentyl phosphorothionate was obtained.

Other compounds which may be useful in the control of endoparisites in warm-blooded animals are:

O-(2,2-dichlorovinyl) O,O-diethyl phosphorothionate;
O-(2,2-dichlorovinyl) O-(2-methoxyethyl) O-methyl phosphorothionate;
O-(2,2-dichlorovinyl) O,O-dioctyl phosphorothionate;
O-(2,2-dichlorovinyl) O,O-di-10-undecenyl phosphorothionate;
O-(2-chloro-2-fluorovinyl) O,O-dimethyl phosphorothionate;
O-(2,2-dichlorovinyl) N,N'-diethyl phosphorodiamidothionate;
O-(2,2-dichlorovinyl) O-methyl O-ethyl phosphorothionate;
O-(2-chlorovinyl) O-methyl O-ethyl phosphorothionate;
O-(2,2-dichlorovinyl) O-methyl O-propyl phosphorothionate;
O-(2-chlorovinyl) O-methyl O-propyl phosphorothionate;
O-(2,2-dichlorovinyl) O-methyl O-isobutyl phosphorothionate;
O-((2-chlorovinyl) O-methyl O-isobutyl phosphorothiona
O-(2,2-dichlorovinyl O-methyl O-octyl phosphorothionate;
O-(2,2-dichlorovinyl) O-ethyl O-pentyl phosphorothionate;
O-(2,2-dichlorovinyl) O-butyl S-butyl phosphorothiolothionate;
O-(2,2-dichlorovinyl) O-propyl O-decyl phosphorothionate;
O-(2,2-dichlorovinyl) O-allyl O-ethyl phosphorothionate;
O-(2,2-dichlorovinyl) O,O-bis(methoxyethyl) phosphorothionate;
O-(2,2-dichlorovinyl) O,O-diphenyl phosphorothionate;
O-(2-chlorovinyl) O,O-dibenzyl phosphorothionate;
O-(2,2-dibromovinyl) O,O-dipropyl phosphorothionate;
O-(2,2-dichlorovinyl) S,S-dimethyl phosphorodithiolothionate
O-(2,2-dichlorovinyl) O-methyl O-phenyl phosphorothionate;
O-(2,2-dichlorovinyl) S-methyl S-octyl phosphorodithiolothionate;
O-(2,2-difluorovinyl) O-methyl S-methallyl phosphorothiolothionate;
O(2,2-dichlorovinyl) N,N'-dimethyl phosphorodiamidothionate;
O-(2,2-dichlorovinyl) O-butyl N-butyl phosphoramidothionate;
O-(2,2-dichlorovinyl) S-methyl-N-octyl phosphoramidothiolothionate;
O-(2,2-dichlorovinyl) O-methyl O-(2,4-dichlorophenyl) phosphorthionate;
O-(2-chlorovinyl) O-ethyl O-(3-nitrophenyl) phosphorothioate;
O-(2,2-dichlorovinyl) S,S-diphenyl phosphorodithiolothionate;
O-(2,2-dichlorovinyl) S-methyl-S-butyl phosphorodithiolothionate;

O-(2,2-dichlorovinyl) N,N'-diphenyl phosphorodiamidothionate; and

O-(2,2-dichlorovinyl) O-methyl-O-benzyl phosphorothionate.

The anthelmintics of this invention can be used to control a wide spectrum of endo-parasitic roundworms, pinworms, whipworms, hookworms, threadworms, cecal worms, stomach worms, hair worms, threadnecked worms, cooperias, and the like. Thus, these anthelmintics can be used to control species of endoparasites of the genera Haemonchus, Trichostrongylus, Ostertagia, Cooperia, Trichuris, Oesophagostomum, Strongyloides, Ascaria, Nematodirus, Ancylostoma, Necator, Gasterirophilus, Nematospiroides, Syphacia, to name some typical genera.

The anthelmintics can be used to eradicate parasites already present or they can be used prophylactically. That is, they can be used to kill an already present worm infestation, or can be used to prevent infestation.

The dosage of the anthelmintic to be used will depend upon the particular kind or kinds of parasites to be controlled; the particular anthelmintic to be used, the kind of host animal, whether the anthelmintic is to be used to cure an already existing infection, or merely as a prophylactic; and the like. These factors are those ordinarily encountered in the treatment of animals to cure and/or prevent their infestation by endoparasites. These factors and their solution are well known to the practitioners in the art. In general, however, larger doses are required to cure an already-existing infestation than are required for prophylaxis. Thus, dosages of the anthelmintic to provide as little as 1 milligram of the anthelmintic per kilogram of live body weight of the animal fed at regular intervals, twice daily or daily, for example, may be sufficient to prevent infestation of animals by endoparasites. However, propylactic dosages ordinarily will amount to about 2–10 milligrams of the anthelmintic per kilogram of animal body weight. The dosage required to eradicate already existing endoparasites ordinarily will be at least about 5 milligrams of the anthelmintic per kilogram of animal body weight, with the usual dosages being about 5–50 milligrams on the same basis. The maximum dosage, of course, in every case will be determined by the toxicity of the anthelmintic to the host animal. The anthelmintics of this invention may be formulated in various ways known in the art. For example, they can be prepared as emulsifiable concentrates, as wettable powders, in capsules, or they can be formulated in thermoplastic resins such as described in U.S. Pat. 3,116,472.

One of the advantages of the phosphorothionates is that they are extremely stable when added to feed. It is known that most biologically active compounds when pre-mixed with food and subjected to storage tend to rapidly lose their efficacy and decompose into other products. The phosphorothionates used in the present invention, and in particular O-(2,2-dichlorovinyl) O,O-dibutyl phosphorothionate, possess excellent storage ability.

The anthelmintic activity of the compounds utilized in this invention in ruminants and the storage stability of these compounds are illustrated by the following examples.

EXAMPLE VI

The anthelmintic activity in ruminants utilizing the compounds of this invention is described in this example. The data were obtained using sheep and calves as ruminants. The test compounds were administered as emulsifiable concentrates (EC), polyvinyl chloride resin pellets containing the active compound (PVC), or by mixing the active component in the feed (Feed). The compounds were administered at dosage levels indicated in the following table. Animals assigned to the control group were given similar quantities of blank formulations. Five animals were tested for efficiency with each compound unless otherwise indicated, and five animals were kept as a control group representative of the parasitic populations.

All animals were kept under the same conditions with no variation in their diets during the entire experimental period.

Two weeks after therapy, all animals were sacrificed and the abomasun and small intestinal contents were washed into fine (No. 60) screens and the parasites were retained in 2% Formalin. The cecum and colon were inspected for parasites and all parasites were retained in 2% Formalin. The abomasun and small intestines were placed in artificial digest solution overnight and the contents were washed on fine screens and the parasites were retained.

All parasites collected were identified and counted and the data were tabulated so as to show the degree of parasitic control the test compound showed compared to the control. The worms classified as roundworms (Haemonchus, Ostertagia, Trichostrongylus, Nematodirus and Oesophagostomum), whipworm (Trichuris) and hookworm. The data are presented in Table I.

TABLE I $$\begin{array}{c} R-O \\ \phantom{R-}\diagdown \\ \phantom{R-O}P-OCH=CCl_2 \\ \phantom{R-}\diagup \\ R'-O \end{array}$$

Average number of worms recovered at necropsy (percent reduction from control)

| R | R' | Dosage, mg./kg. | Formulation | No. of animals | Haemonchus | Ostertagia | Trichostrongylus | Nematodirus | Oesophagostomum | Hookworm | Cooperia | Trichuris | Total |
|---|---|---|---|---|---|---|---|---|---|---|---|---|---|
| Control | | | | 5 sheep | 3,347 | 284 | 2,400 | 1,120 | 3 | 0.2 | | 137 | 7,295 |
| CH₃ | CH₃ | 25 | EC | do | 1,468 (56) | 1,732 (0) | 2,193 (9) | 564 (50) | 1 (67) | 11 (0) | | 1 (99) | 5,973 (18) |
| CH₃ | CH₃ | 50 | EC | do | 1,112 (67) | 1,992 (0) | 3,484 (0) | 668 (39) | 4.2 (0) | 281 (0) | | 17 (88) | 7,882 (0) |
| CH₃ | CH₃ | 100 | EC | do | 360 (89) | 745 (0) | 2,860 (0) | 130 (88) | 0 (100) | 66 (0) | | 0 (100) | 4,169 (43) |
| CH₃ | CH₃ | 50 | PVC | do | 740 (78) | 1,000 (0) | 2,752 (0) | 364 (68) | 0 (100) | 0.2 (0) | | 0 (100) | 4,881 (33) |
| Control | | | | do | 400 | 2,076 | 6,020 | 1,816 | 0.8 | 16 | | 136 | 10,465 |
| C₄H₉ | C₄H₉ | 50 | EC | 3 sheep | 13 (97) | 280 (87) | 200 (97) | 27 (99) | 27 (0) | 8 (50) | | 136 (0) | 666 (84) |
| Control | | | | 4 sheep | 1,485 | 380 | 2,810 | 1,775 | 1 | 1.5 | | 24 | 6,477 |
| C₄H₉ | C₄H₉ | 50 | Feed | 3 sheep | 187 (87) | 447 (0) | 273 (90) | 0 (100) | 0.3 (67) | 0 (100) | | 6 (75) | 913 (86) |
| Control | | | | 5 sheep | 244 | 888 | 3,756 | 1,672 | 2 | 5 | | 11 | 6,582 |
| C₄H₉ | C₄H₉ | 25 | EC | do | 8 (97) | 128 (86) | 64 (98) | 108 (94) | 1 (50) | 1 (80) | | 25 (0) | 335 (95) |
| C₃H₇ | C₃H₇ | 50 | EC | 1 sheep* | 0 (100) | 0 (100) | 0 (100) | 0 (100) | 1 (50) | 0 (100) | | 0 (100) | 1 (100) |
| C₃H₇ | C₃H₇ | 25 | EC | do.* | 0 (100) | 20 (98) | 20 (99) | 200 (88) | 1 (50) | 0 (100) | | 36 (0) | 277 (96) |
| C₅H₁₁ | C₅H₁₁ | 25 | EC | 5 sheep | 260 (0) | 576 (35) | 700 (81) | 292 (83) | 3 (0) | 5 (0) | | 45 (0) | 1,880 (71) |
| Control | | | | 5 calves | 0 | 5,124 | 13,460 | 0 | 38 | 0 | 1,944 | 72 | 20,638 |
| C₄H₉ | C₄H₉ | 50 | Feed | 3 calves | 0 (0) | 47 (99) | 47 (99) | 0 (0) | 0 (100) | 7 (0) | 7 (99) | 57 (21) | 157 (99) |

*4 Animals died of organophosphate intoxication.

EXAMPLE VII

A 25% w., dry blend of a test compound in powdered polyvinyl chloride was prepared and 1.2 grams of this blend was thoroughly incorporated with a commercial ground ruminant feed. Samples of the treated feed were stored at 21°, 38° and 55° C. for various periods of time.

The amount of test compound remaining in the feed at a given period of time was determined by bulk extraction of the feed with a 1:1 mixture of ethyl acetate and acetone followed by GLC using comparable solutions of test compounds as standards.

The stability of the test compounds is shown in Table II.

TABLE II $$\begin{array}{c}R\\ \diagdown\\ O\quad Z\\ \diagdown\uparrow\\ P-OCH=CCl_2\\ \diagup\\ O\\ \diagup\\ R'\end{array}$$

| | | | \multicolumn{8}{c}{Percent compound remaining in feed} |
|---|---|---|---|---|---|---|---|---|---|---|
| | | | 38° C. | | 55° C. | | 21° C. | | | |
| Z | R | R' | 2 wks. | 4 wks. | 2 wks. | 4 wks. | 1 mo. | 2 mos. | 3 mos. | 6 mos. |
| S | C₄H₉ | C₄H₉ | 96 | — | 95 | — | 92 | 90 | — | — |
| S | C₄H₉ | C₄H₉ | 97 | 98 | 91 | 84 | — | — | 98 | 100 |
| S | C₄H₉ | C₄H₉ | 97 | 93 | 100 | 100 | 100 | 100 | 100 | 100 |
| S | CH₃ | CH₃ | 37 | — | 7 | — | — | — | 43 | — |
| O | CH₃ | CH₃ | — | — | 15 | — | — | — | — | — |

From the above it is evident that O-(2,2-dichlorovinyl) O,O-dibutyl phosphorothionate possesses excellent storage stability in ground feed for an extended period of time.

We claim as our invention:

1. A method of controlling endoparasitic worms in warm-blooded animals which comprises orally administering to said animals a parasitically effective dosage of an anthelmintic compound of the formula

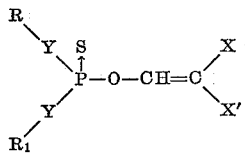

wherein R and R' are independently selected from the group consisting of alkyl, aryl, aralkyl, alkenyl, alkynyl and alkoxyalkyl of up to 12 carbon atoms, Y and Y' are independently selected from the group consisting of O, S, NR and NH, X is a member selected from the group consisting of fluorine, chlorine, bromine and iodine and X' is a member selected from the group consisting of fluorine, chlorine, bromine, iodine and hydrogen.

2. A method according to claim 1 wherein R and R' are alkyl, Y and Y' are O.

3. The method according to claim 2 wherein R and R' are alkyl of 4 to 8 carbon atoms and X and X' are chlorine.

4. The method according to claim 3 wherein R and R' are each pentyl.

5. The method according to claim 3 wherein R and R' are each n-butyl.

6. The method according to claim 3 wherein R is methyl and R' is octyl.

7. The method according to claim 3 wherein the warm-blooded animal is a ruminant.

8. The method according to claim 7 wherein the ruminant is a sheep.

9. The method according to claim 7 wherein the ruminant is a member of the cattle family.

10. An anthelmintic composition comprising a parasitically effective amount of a compound of the formula

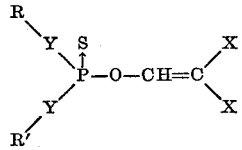

wherein R and R' are independently selected from the group consisting of alkyl, aryl, aralkyl, alkenyl, alkynyl and alkoxyalkyl of up to 12 carbon atoms, Y and Y' are independently selected from the group consisting of O, S, NR and NH, X is a member selected from the group consisting of fluorine, chlorine, bromine and iodine and X' is a member selected from the group consisting of fluorine, chlorine, bromine, iodine and hydrogen in a pharmaceutically acceptable carrier.

References Cited

UNITED STATES PATENTS

| 3,264,184 | 8/1966 | Geiger et al. | 424—219 |
| 3,116,201 | 12/1963 | Whetstone | 260—957 X |
| 3,174,990 | 3/1965 | Ward et al. | 260—957 |

FOREIGN PATENTS

| 1,058,046 | 5/1959 | Germany | 260—957 |

SAM ROSEN, Primary Examiner